United States Patent
Shaffer et al.

(10) Patent No.: US 6,377,798 B1
(45) Date of Patent: Apr. 23, 2002

(54) SYSTEM AND METHOD FOR IMPROVED WIRELESS TELEPHONE CALL RECEPTION NOTIFICATION

(75) Inventors: Shmuel Shaffer, Palo Alto; William Joseph Beyda, Cupertino, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/235,564

(22) Filed: Jan. 22, 1999

(51) Int. Cl.[7] ................................................. H04Q 7/20
(52) U.S. Cl. ...................................... 455/426; 455/456
(58) Field of Search ................................ 455/426, 552, 455/572, 556, 574, 343, 127, 553, 38.3; 340/825.44, 825.47

(56) References Cited

U.S. PATENT DOCUMENTS

| | | |
|---|---|---|
| 4,748,655 A | 5/1988 | Thrower et al. |
| 5,455,499 A | 10/1995 | Uskali et al. |
| 5,526,398 A * | 6/1996 | Okada et al. ............... 455/426 |
| 5,648,717 A | 7/1997 | Uskali |
| 5,737,707 A | 4/1998 | Gaulke et al. |
| 5,790,528 A | 8/1998 | Muszynski |
| 5,797,097 A | 8/1998 | Roach, Jr. et al. |
| 5,802,470 A | 9/1998 | Gaulke et al. |

* cited by examiner

Primary Examiner—Marsha D. Banks-Harold (57) ABSTRACT

A cellular telephone (116) and a pager (118) having a common battery (256) are integrated into a single unit. The unit is maintained in a low-power receive page mode when not in use. An incoming call is processed first as a conventional pager message. The device receives the page and wakes from the low-power page mode. When the device has gone to full-power active mode, a cellular phone call is connected. A smart battery controller (254) for the unit is provided. The smart battery controller (254) monitors the power level left in the battery (256) and stops allowing telephone operations when power reaches a minimum level. For example, the level may be configurable by the user as the number of hours of paging that may be accommodated after cell phone operations are no longer permitted.

20 Claims, 7 Drawing Sheets

SYSTEM AND METHOD FOR IMPROVED WIRELESS TELEPHONE CALL RECEPTION NOTIFICATION

BACKGROUND OF THE INVENTION

The present invention relates to telecommunications systems and, particularly, to an improved notification system and method for cellular telephones.

Many users rely on one or more portable devices, such as pagers and cellular telephones, to maintain a telecommunications link while traveling. Pagers are advantageous in that they are small and consume relatively little battery power. For example, a pager can typically run as long as a month on a single AA battery. In addition, the cost of maintaining a pager service is typically minimal. However, pagers do not allow for duplex communication.

Cellular telephones, on the other hand, have been developed which are extremely small, but consume large amounts of battery power. For example, a cellular telephone can discharge its battery in a single day even in standby mode waiting for a call to be received. Thereafter, several hours are required to recharge the battery.

Often, users carry both a pager and a cellular telephone. The pager is maintained as an initial notification device. When a call is received on the pager, typically a return phone number is delivered, either manually or by a caller-ID mechanism. To return the call, the user must then turn on the cell phone and dial the number. To enhance such usability, pagers and cellular phones have been developed which are packaged together in the same housing. In particular, U.S. Pat. Nos. 5,737,707 and 5,802,470 describe a personal communications device including both a pager and a cellular telephone. The cellular telephone is normally kept off and draws no power. When an incoming call for the cellular telephone arrives at the cellular exchange, and it is determined that the cellular phone has not been registered with a base station, a paging system transmits a paging signal to the integrated pager. The pager receives the signal and wakes the cellular telephone, which then processes the call. When the call is completed, a second paging message is provided, and the cellular telephone shuts down.

While the system described in the '707 and '470 patents is useful in conserving battery power, it is still possible for the cellular telephone to draw too much power and cause the paging system to have to shut down (even though the pager draws much less power than the cell phone).

Accordingly, there is a need for a combined cellular telephone/pager wherein power may be conserved and messaging capabilities preserved.

SUMMARY OF THE INVENTION

These disadvantages in the prior art are overcome in large part by a system and method according to the present invention. According to one aspect of the invention, a cellular phone and a pager having a common battery are integrated into a single unit. The unit is maintained in a low-power receive page mode when not in use. An incoming call is processed first as a conventional pager message. The device receives the page and wakes from the low-power page mode. When the device has gone to full-power active mode, a cellular phone call is connected. A smart battery controller for the unit is provided. The smart battery controller monitors the power level left in the battery and stops allowing phone operations when power reaches a minimum level. For example, the level may be configurable by the user as the number of hours of paging that may be accommodated after cell phone operations are no longer permitted.

A better understanding of specific embodiments of the invention is obtained when the following detailed description is considered in conjunction with the following drawings.

DETAILED DESCRIPTION OF THE INVENTION

Figure 1:
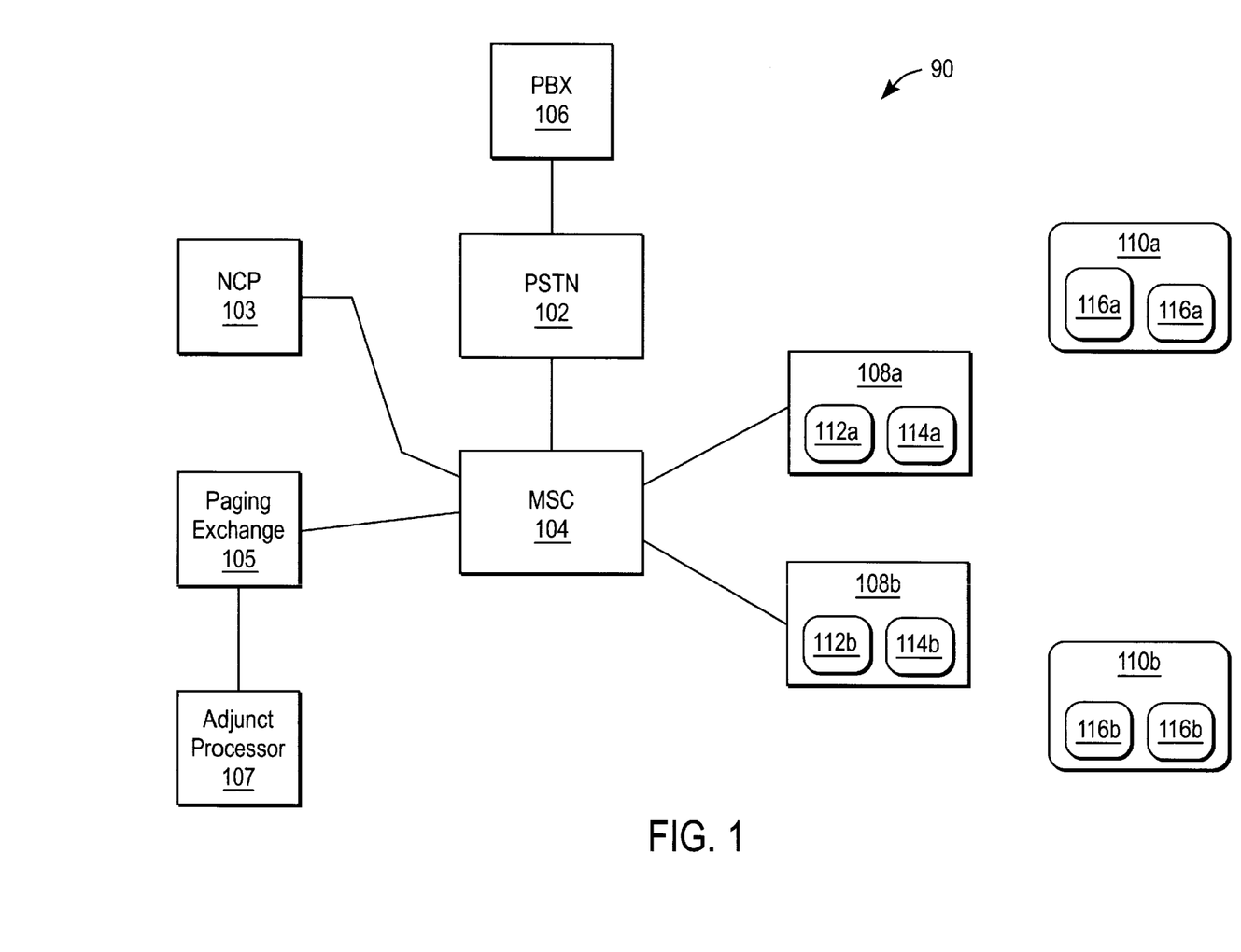
FIG. 1 is a diagram illustrating a cellular phone and paging system according to an embodiment of the invention.

FIG. 1 illustrates a telecommunications system generally identified by the reference numeral 90 according to an embodiment of the invention. The telecommunications system 90 includes a combined cellular telephone and paging system. In particular, the system 90 includes one or more metropolitan switching centers (MSC) 104, which serve as wireless call exchanges and provide wireless call processing and call routing services. A network control point 103 is coupled to the MSC 104 and provides a database of information about the configuration of the cellular system. A plurality of base stations 108a, 108b are provided, which connect to the MSC 104 and provide wireless call service to the cellular telephones presently located in the respective cells serviced by the base stations.

A paging exchange 105 is further provided which provides paging services to one or more pagers (not shown). Typically, the area serviced by the paging system encompasses one or more cells. To provide call capability between the wireless telephones and landline phones (not shown), the MSC 104 is connected to the public switched telephone network (PSTN) 102.

According to an embodiment of the invention, at least some cellular system users, such as users 110a, 110b, are equipped with personal communications devices which include both a cellular telephone 116a, 116b and a pager 118a, 118b, respectively. The telecommunications system 90 further includes an adjunct processor 107 that is coupled to the MSC 104, NCP 103, and paging exchange 105, and that provides for cellular-call completion with the aid of the paging system. Such a processor is generally described in U.S. Pat. No. 5,802,470, which is incorporated by reference in its entirety as if fully set forth herein.

Figure 2:
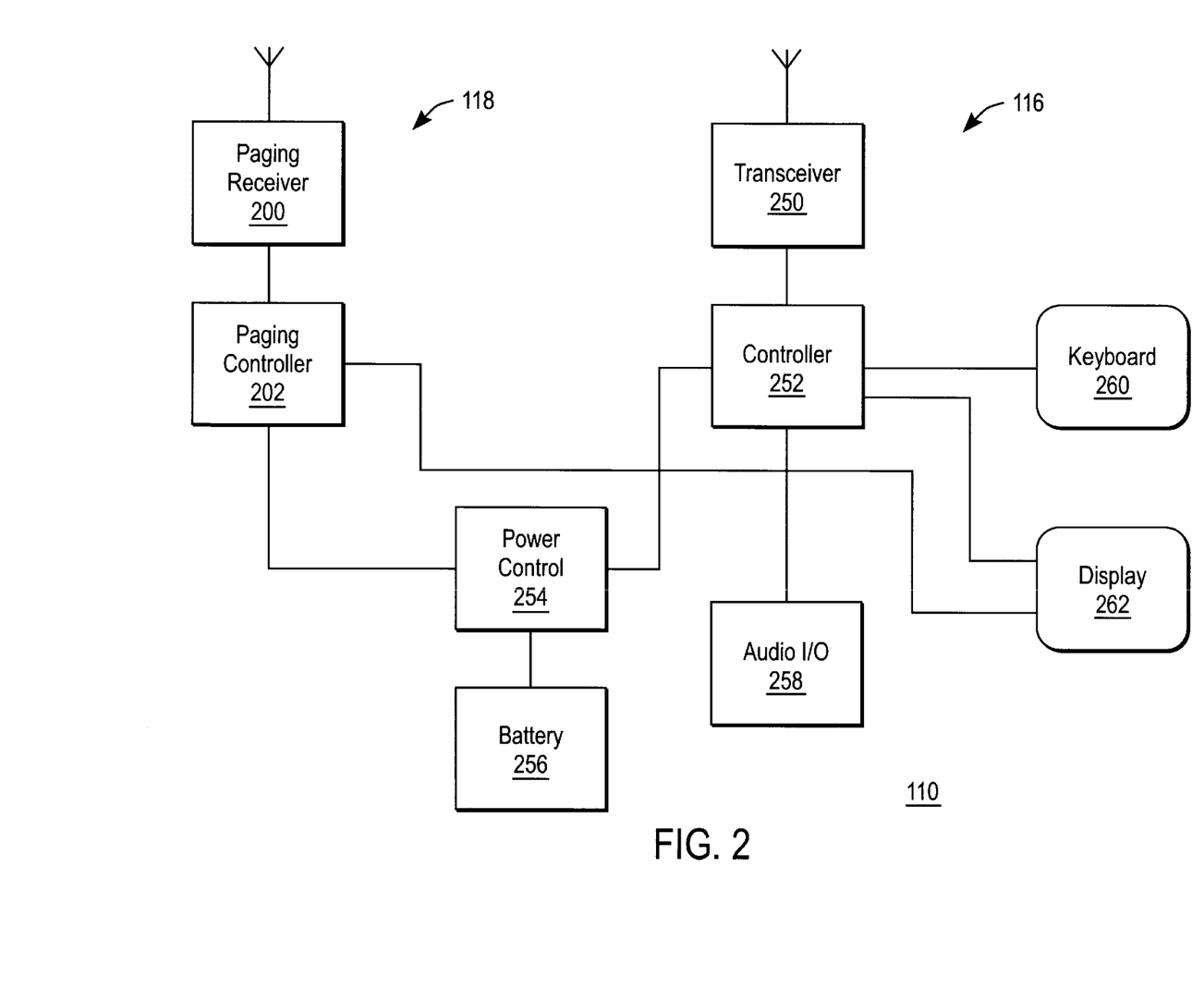
FIG. 2 is a block diagram illustrating a personal communication device according to an embodiment of the invention.

An exemplary personal communications device 110 according to an embodiment of the invention is shown in FIG. 2. The personal communications device 110 includes a pager 118 and a cellular phone 116 integrated into a single unit. The cellular phone 116 includes a known transceiver 250 operating under control of a cellular phone controller 252 and powered by a battery 256. The transceiver 250 and cellular phone controller 252 are coupled to the battery 256 through a power control circuit 254, which switches power to the cellular phone 116 when a page is received and, as will be described in greater detail below, when there is sufficient "remaining" power left for phone operation. The cellular phone controller 252 further is coupled to receive inputs from a keypad or other input device 260, and provide audio signals to an audio control or I/O unit 258. A display 262, which may be a liquid crystal or other type of display, may also be provided. In addition, as will be described in greater detail below, the display 262 or the audio I/O 258 may be used to provide notification of how much charge remains, or how long the phone may be used.

The pager 118 includes a conventional paging receiver 200 connected to a conventional paging controller 202 which performs paging decoding. The paging controller 202 also interfaces to the power control circuit 254. The paging receiver 200 and the paging controller 202 are powered by the battery 256, and are always turned on. When the paging controller 202 decodes a received incoming-call indication, it not only alerts the user thereof but also causes the power control circuit 254 to close a switch (not shown), if sufficient power remains for phone operation, thereby connecting the cellular phone controller 252 and the cellular phone transceiver 250 to the battery 256 and turning the cellular phone 116 on. This causes the cellular phone 116 to undergo registration in a known manner and thus become able to receive the incoming call. When the paging controller 202 decodes a received power turn-off indication, it causes the power control circuit 254 to open the switch, thereby disconnecting the transceiver 250 and the cellular telephone controller 252 from the battery 256 and turning the cellular phone 116 off, whereby the cellular phone 116 again becomes unable to receive incoming calls.

Figure 3:
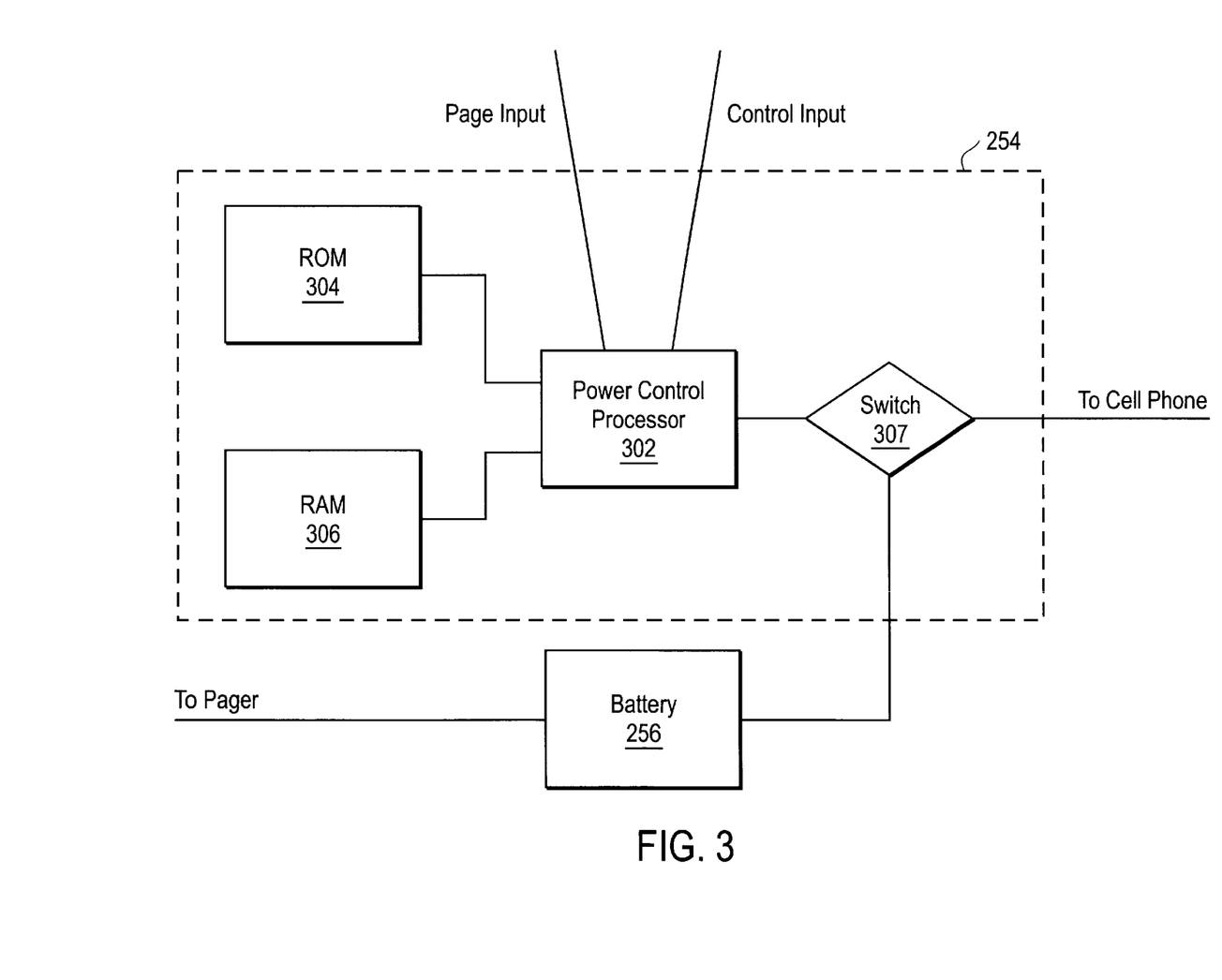
FIG. 3 is a block diagram illustrating a power control unit according to an embodiment of the invention.

In particular, an exemplary power control circuit 254 according to an embodiment of the present invention is illustrated in greater detail in FIG. 3. The power control circuit 254 includes a power control processor 302 coupled to receive inputs from the keypad 260 (FIG. 2) and the paging controller 202. In addition, the power control circuit 302 is coupled to a read-only memory 304 which stores a look-up table related to a power consumption profile of the cellular phone 116. A random access memory 308 is also coupled to the power control processor 302, to act as a temporary storage for current power consumption information. Finally, the power control processor 302 is coupled to control a switch 307 for coupling power to the cellular telephone 116 (FIG. 2).

Generally, the power control processor 302 monitors duration of use of the cellular telephone 116, as well as duration of use of the pager 118, and inhibits operation of the cellular phone 116 if its use will provide too great a drain on available remaining power. To do so, the ROM 304 stores the battery charge capacity and, if necessary, a profile of the paging power consumption, as well as a profile of cell phone power consumption. The power control processor 302 then monitors current discharge over time of the battery 256, and integrates the current discharge curve to arrive at a battery discharge level. Remaining battery capacity is then the full charge level minus the discharge. Such a method is described in U.S. Pat. No. 5,648,717, which is hereby incorporated by reference in its entirety as if fully set forth herein. The power control processor 302 then compares the profile of paging and cell phone power consumption to determine how many hours of paging operation are available. (Since reception of paging messages consumes more power than waiting for paging messages, the number of past paging messages may also be taken into account in this calculation).

Figure 4:
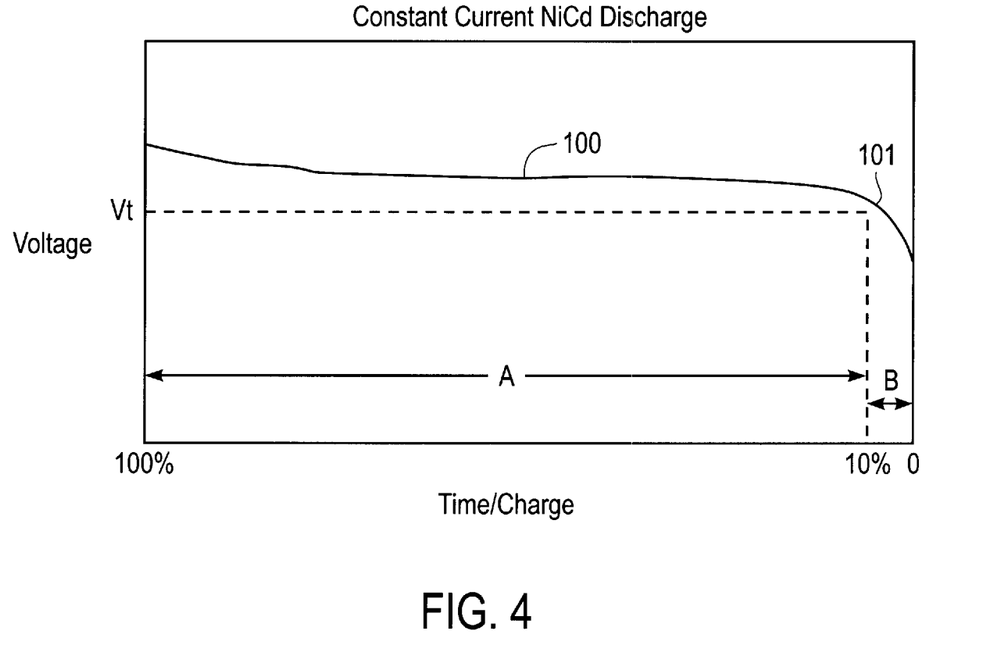
FIG. 4 is a diagram of a voltage profile of a battery that may be used in an embodiment of the invention.

Because inaccuracies in the current integration can build up over time, an additional check on the charge level remaining may be provided, by monitoring battery voltage levels. In particular, FIG. 4 illustrates the voltage discharge characteristic of an exemplary device battery, e.g., nickel-cadmium battery. Typically, this profile is stored in the ROM 304. The profile has a substantially flat characteristic A extending from a maximum charge on the left hand side for a major portion of the battery charge, where battery charge is relatively high. It also has a rapidly falling region B in a minor portion of battery charge, where battery charge is relatively low. The major portion 101 of battery charge is represented by the area beneath the characteristic from 100% on the left hand side to the drop point in the profile at a predetermined charge level of approximately 10% of maximum battery charge. The minor portion 101 of battery charge is represented by the area under the graph from the profile drop point to the right hand side, where the remaining battery charge is virtually zero.

The power control processor 302 monitors the battery voltage and compares the measured voltage with a voltage threshold $V_t$ which is stored in memory. When the measured voltage crosses the threshold $V_t$, the power control processor 302 updates the charge level or time remaining, overriding the value obtained from the integration calculation. This value is then used for the duration calculation.

In addition, the power control processor 302 may receive as an input a desired period of operation. More particularly, the user may input "24 hours" as the desired period, meaning that it is desired that the personal communications device be capable of receiving pages for a period of 24 hours. If no particular time is input, a default level may be set.

When a call is received at the pager, the power control processor 302 determines the battery discharge level (using either the integration method or the voltage profile method), the number of hours remaining in the pre-set charge period, and the amount of charge necessary to power the pager. So long as sufficient power remains to power the pager for the time remaining, the call will be completed. If, however, insufficient power remains, the call will not be completed (so that the device has adequate power reserves to accommodate future pages to be received for the duration of the pre-set charge period). Additionally, if a call is completed and during the call the charge level approaches the threshold, the call may be disconnected, after providing appropriate notification and the opportunity to gracefully terminate the call.

More particularly, the power control circuit 254 may provide a signal to the cell phone controller 252 indicative of the amount of time the cell phone may be used before charge drops below a level adequate to power the pager during the remaining period. As that time is approached, the controller 252 may provide a message either on the display 262 or via the audio I/O 256 indicating that the threshold is being approached or the amount of remaining time available for phone use. Such a message may be stored in memory (not shown) in the controller 252. Moreover, if an audio message is provided, it may be provided in a known manner such that only the user, and not the other party, hears the message.

Figure 5A:
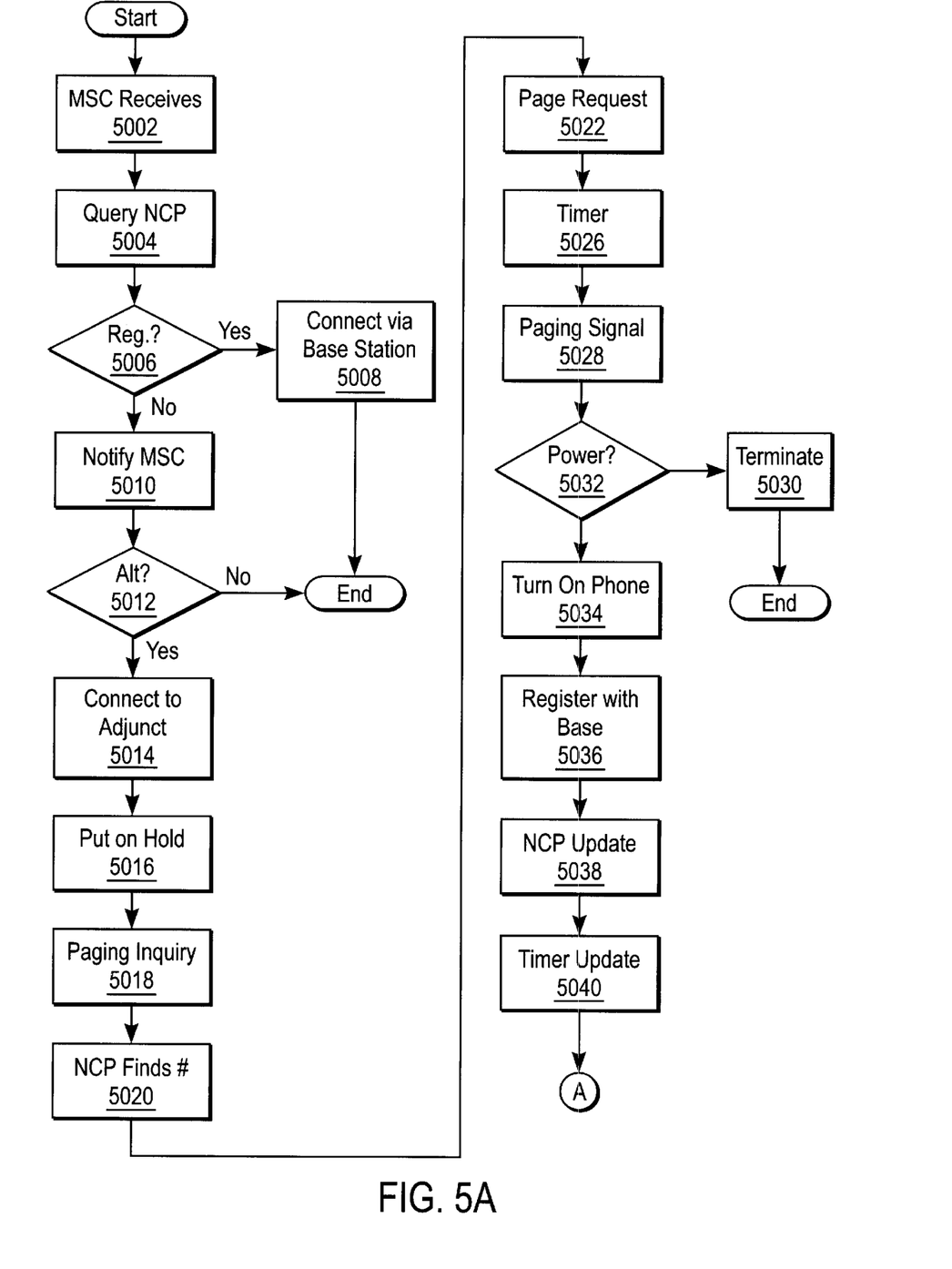
FIGS. 5A–5B show a flowchart illustrating system operation according to an embodiment of the invention.
Figure 5B:
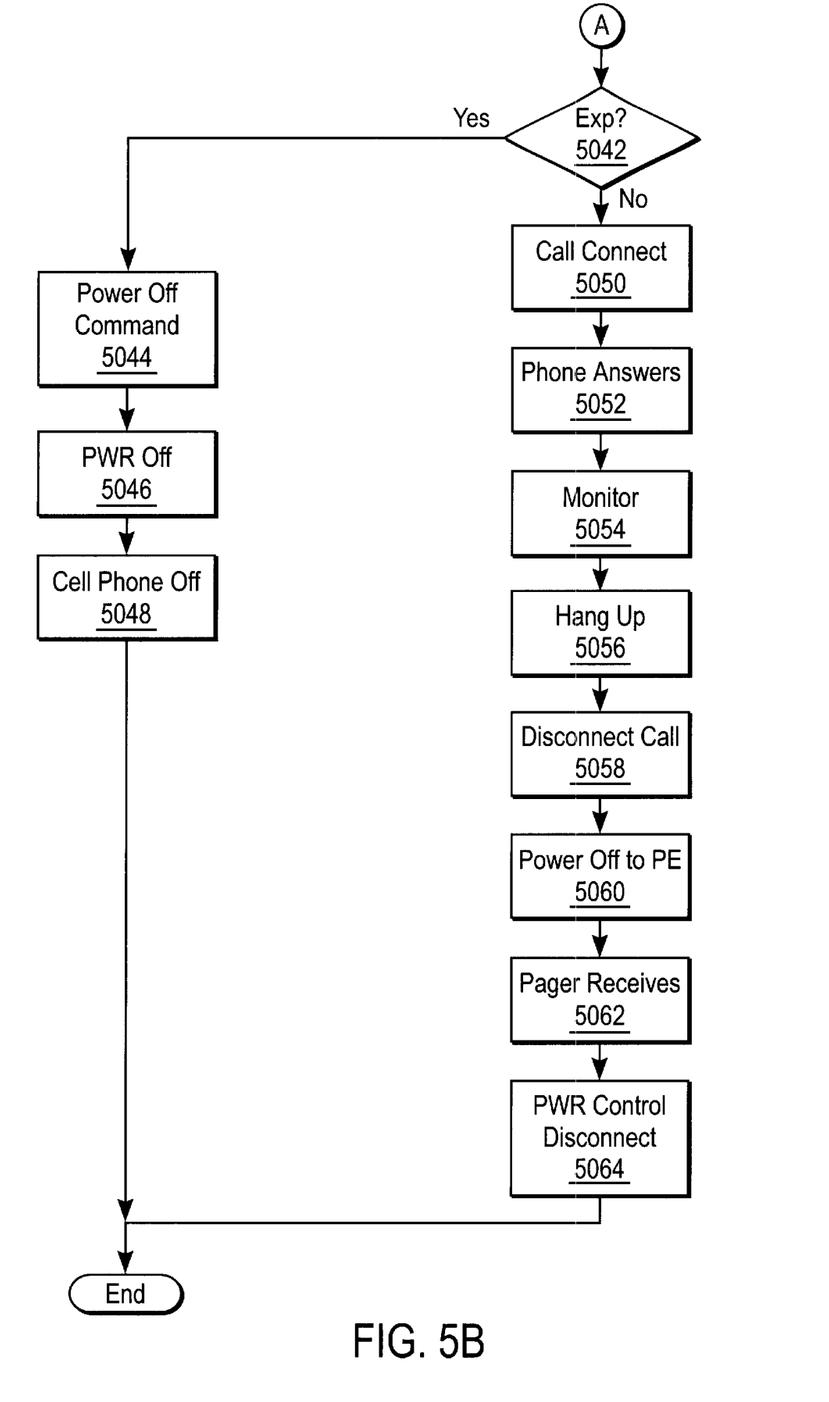

Operation of the present invention is illustrated in flowchart form in FIGS. 5A–5B. When the MSC 104 receives a call incoming for a cellular phone 116a, either from a landline telephone via the PSTN 102 or from another cellular phone 116b it attempts to extend the call to the cellular phone 116a in a step 5002. First, in a step 5004, the MSC 104 sends a query containing the called number to the NCP 103 to determine if the called cellular phone 116a is registered with any base station 108a, 108b, and if so, which one. The NCP 103 responds to the query by searching its data to determine if the called cellular phone 116a is registered, in a step 5006. If the called cellular phone 116a is registered, it is able to receive the incoming call; the NCP 103 conventionally sends the information back to the MSC 104 in a query response, and the MSC 104 conventionally extends the call to the called cellular phone 116a via the one of the base stations with which cellular phone 116a is registered, in a step 5008. However, if the NCP 103 finds that the called cellular phone 116a is presently not registered with any base station, it is not able to receive the incoming call and the attempt at extending the call to the cellular phone 116a cannot be completed, and the NCP 103 notifies the MSC 104 thereof, in a step 5010. In response, the MSC 104 sends another query to the NCP 103 inquiring whether alternative call treatment is being provided for this cellular phone 116a, in a step 5012. Alternative treatment may include a call-coverage path, such as connecting the call to the called party's mailbox in a voice messaging system (not shown). According to the invention, the data in the NCP 103 provide for alternative call treatment for the cellular phone 116a, and the first alternative call destination in the coverage path of cellular phone 116a is specified to be the adjunct processor 107. The NCP 103 makes this determination and sends a notice thereof to MSC 104. In response, the MSC 104 routes and connects the call to the adjunct processor 107 in a step 5014. The adjunct processor 107 receives the call and puts it on hold in a step 5016. While the call is on hold, the adjunct processor 107 plays a pre-recorded announcement to the caller informing the caller to stay on the line while the called party is paged. The adjunct processor 107 also sends a paging query for the called cellular phone 116a to the NCP 103 in a step 5018. The NCP 103 finds the pager number of the pager 118a that is associated with the cellular phone 116a in its records for cellular phone 116a in a step 5020 and sends this pager number to the adjunct processor 107 in a step 5022. In response, the adjunct processor 107 sends a paging request to the paging exchange 105 in a step 5024. The paging request contains the pager number of the pager 118a and a request to send it an incoming-call indication. The adjunct processor 107 also starts a timer (not shown) that gives the cellular phone 116a a predetermined amount of time to become registered in a step 5026. In response to the paging request, the paging exchange 105 broadcasts an incoming-call-indicative paging signal containing the pager number provided by the adjunct processor 107 and an incoming-call-indication code in a step 5028.

When the pager 118a receives and recognizes the incoming-call-indicating paging signal, it responds by causing the power control processor 302 to make a determination of whether sufficient power remains for the completion of the cellular phone call, in a step 5032. If it does not, the call may terminate, in a step 5030 (or the caller may be directed to voicemail). If sufficient power does remain, then the cellular phone 116a is turned on in a step 5034. In response, the cellular phone 116a automatically undergoes registration with the base station 109 that serves the cell in which the cellular phone 116a is presently located in a step 5036. The base station 109 notifies the MSC 104 of the registration and the MSC 104 in turn notifies the NCP 103 causing the NCP 102 to update its records for cellular phone 116a in a step 5038.

In the meantime, the adjunct processor 107 periodically polls the NCP 103 for the status of the cellular phone 116a. Until the cellular phone 116a registers with a base station, the NCP 103 replies to the poll with an indication that the cellular phone 116a is not registered. In response to the indication of non-registration, the adjunct processor 104 repeats polling of the NCP 103 until the timer that adjunct processor 107 had started times out in a step 5040.

As shown in FIG. 5B, if the cellular phone 116a registers with a base station and the NCP 103 is informed thereof before the timer times out (as determined in a step 5042), the NCP 102 replies to a poll with an indication that the cellular phone 116 is registered and an identification of the base station 109 with which the cellular phone 116a is registered. In response to this indication, the adjunct processor 107 resets the timer that it had started. The timer now begins to time an interval during which the cellular phone 116a must answer the call. The adjunct processor 104 also bridges the call back to the MSC 104. This results in the call being connected back to the MSC 104 through the adjunct processor 104, thereby allowing the adjunct processor 107 to monitor the call. The MSC 104 responds to the bridged call as if it had just received the call, and attempts to connect the call to the cellular phone 116a in the conventional manner, at step 5050.

The controller 252 also may receive a signal indicating how long the user may use the phone if it is desired to continue page mode for the duration of the pre-set period. Further, if the period is approached, an appropriate indication is given to the user. For example, the controller 252 may access its memory (not shown) for a predetermined message to be displayed via the display 262 or delivered via the audio I/O 256.

The adjunct processor 107 continues monitoring the call in a step 5054. If the base station 109 connects the call to cellular phone 116a, and the cellular phone 116a answers the call before the timer that adjunct processor 104 had reset times out, the adjunct processor 104 detects the call answer. In response, the adjunct processor 104 turns off the timer and continues to monitor the call, at step 5054. When one of the parties to the call hangs up the call, e.g., at step 5056, and the base station 109 proceeds to disconnect the call, at step 5058, the adjunct processor 107 detects this condition. In response, the adjunct processor 107 sends a power turn-off paging request for the pager number of the pager 11 8a to the paging exchange 105, at step 5060. The paging exchange 105 responds by broadcasting the request via a paging signal. The pager 118a receives and recognizes the paging signal, in a step 5062, and responds thereto by turning off the cellular phone 116a, in a step 5064.

Returning to step 5042 of FIG. 5B, if the timer that was reset times out before the adjunct processor 107 detects that the cellular phone 116a answered the call, the adjunct processor 107 sends a power turn-off paging request for the pager number of pager 118a to paging exchange 105, at a step 5044. The paging exchange 105 responds by broadcasting the request via a paging signal, in a step 5046. The pager 118a receives and recognizes the paging signal and responds thereto by turning off cellular phone 116a in a step 5048.

Figure 6:
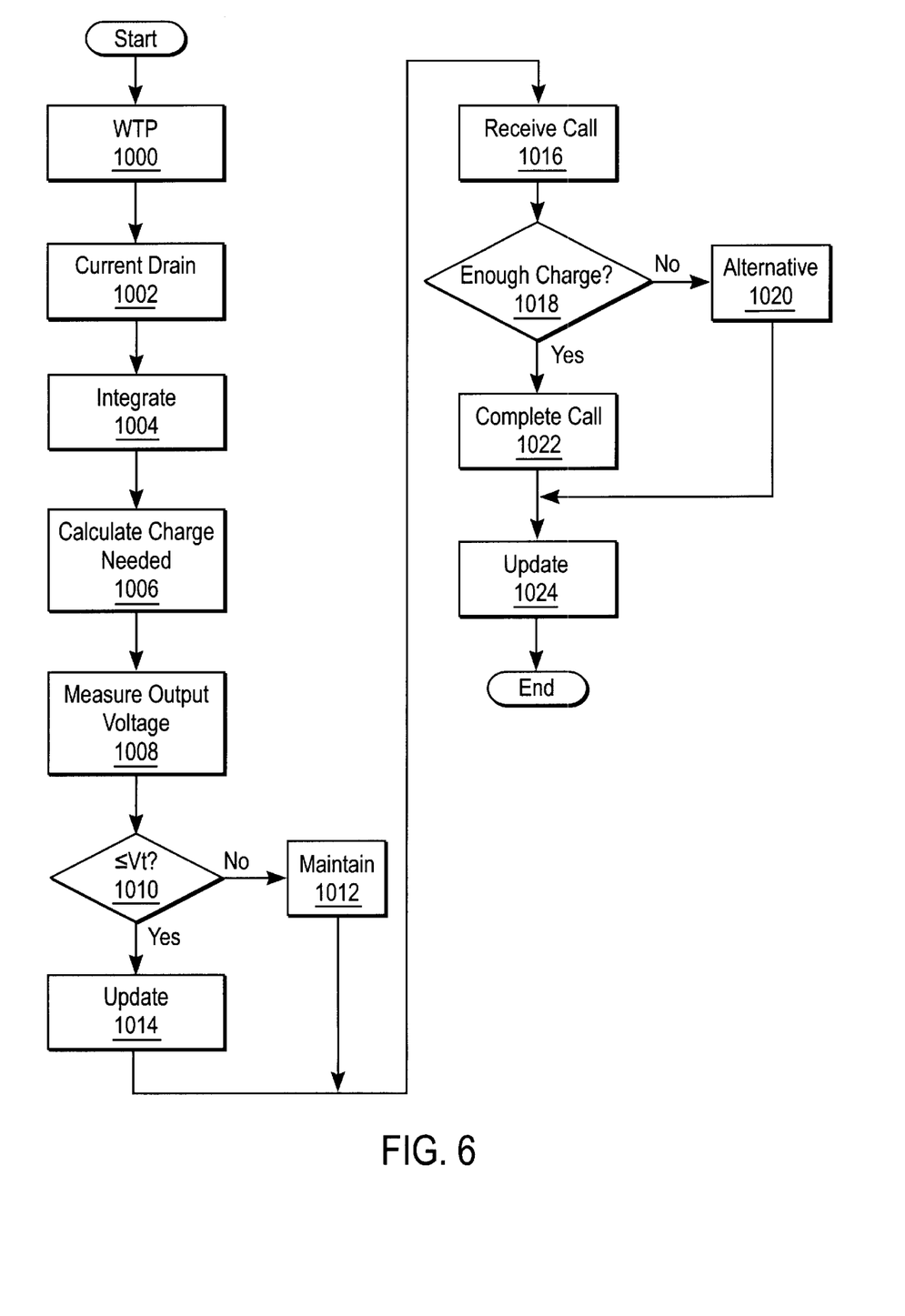
FIG. 6 is a flowchart illustrating operation of an embodiment of the invention.

Turning now to FIG. 6, a flowchart illustrating operation of the power control circuit 254 according to an embodiment of the invention is illustrated. As discussed above, the power control circuit 254 receives as a user input via a keypad 260 a "working time period," in a step 1000. The working time period is representative of the period for which the personal communications device should be able to remain active to receive pages. The working time period may be a default period, rather than requiring individual setting. This information is stored in RAM 306. From the working time period information, the power control processor 302 may continually calculate how much charge is required to maintain the personal communications device in page receive mode for the time remaining of the working time period.

Next, in a step 1002, the power control processor receives as an input the current drain on the battery. Then, in a step 1004, the power control processor 302 performs an integration of the current versus time function to obtain the charge information. In a step 1006, the power control processor 302 determines how much of the remaining charge is required to maintain the personal communications device in page receive mode for the remaining portion of the working time period. Any excess charge may be used to process cellular phone calls.

In addition, in one embodiment, the output voltage of the battery may be measured, in a step 1008. The output voltage is compared to the threshold $V_t$. If the voltage is at or below the threshold, as determined in a step 1010, then the time and charge remaining before complete discharge is updated, in a step 1014. Otherwise, the values obtained through the integration process are maintained, in step 1012.

Next, in a step 1016, a page indicative of an incoming cellular telephone call may be received, as described above. In a step 1018, the power control processor 302 determines whether sufficient charge is available for the unit to process the cell phone call. If so, then in a step 1022, the call is connected and processed as described above. If not, however, then in a step 1020, a busy signal may be provided (or the call may be routed to voicemail). In any case, the call is not connected, though a page message may still be provided to the user. Finally, in a step 1024, the charge calculation is updated.

In some embodiments, back in step 1018, the power control circuit 254 may provide a signal to the control processor 252 indicating how much charge remains; and the control processor 252 in turn may provide an indication to the user of how long a cell phone conversation may be carried on before the threshold is reached. Alternatively, the control processor 252 may continue to monitor and provide an indication when the threshold has been reached (or immediately before).

Although the specific embodiments of the present invention are discussed in the context of a cellular telephone environment, the present invention also has application in any cordless telephony devices such a cordless phone, a personal digital assistant, or a wireless telephony-over-local area network (ToL) device.

What is claimed is:

1. A personal communications device operable in a paging mode and in a cellular telephone mode, comprising:
    a pager, said pager adapted in said paging mode to receive a paging message from a paging exchange indicating that a cellular telephone call is incoming, the paging message comprising an incoming call indicating message;
    a cellular telephone, said cellular telephone, when turned on, adapted in said cellular telephone mode to receive an incoming call indicating message indicating that a cellular telephone call is incoming;
    a battery operably coupled to provide power to said pager and said cellular telephone; and
    a power control circuit, in response to said cellular telephone to which said cellular telephone call is directed being turned off and thus exiting said cellular telephone mode and entering said paging mode, configured to connect said battery to said cellular telephone when an incoming paging message received by said pager indicates that said cellular telephone call is incoming, and when said power control circuit determines that sufficient charge remains in said battery over a predetermined period for said personal communications device to remain in at least a page receive mode over said predetermined period;
    wherein if sufficient charge remains, said cellular telephone call is switched from said pager and paging mode back to said cellular telephone and said cellular telephone mode.

2. A personal communications device, in accordance with claim 1, said power control circuit configured to monitor current discharge of said battery over time.

3. A personal communications device, in accordance with claim 2, said power control circuit configured to integrate said current discharge of said battery over time to obtain a charge value.

4. A personal communications device, in accordance with claim 3, wherein said power control circuit is configured to use said charge value to determine a time remaining during which sufficient charge exists to power said pager.

5. A personal communications device, in accordance with claim 1, wherein said power control circuit is configured to store a voltage discharge profile of said battery and monitor points on said profile.

6. A personal communications device, in accordance with claim 5, wherein said power control circuit is configured to use said voltage discharge curve and said measured voltage to determine a period of time remaining of sufficient charge to said pager.

7. A personal communications device according to claim 1, wherein said power control circuit is configured to provide a signal indicative of an amount of charge remaining to said cellular telephone, whereby said cellular telephone is configured to provide an indication of said amount of charge remaining or when said sufficient charge is reached.

8. A method for operating a personal communications device, comprising:
    receiving a telephone call at an exchange;
    determining whether a cellular telephone to which said telephone call is directed is turned on and thus operable in a cellular telephone mode;
    sending a paging message to said personal communications device if said cellular telephone is turned off and thus exiting said cellular telephone mode and entering a paging mode, said paging message comprising an incoming call indicating signal;
    determining, whether sufficient charge remains in a battery to operate said personal communications device in a paging mode for a remaining portion of a predetermined period if said telephone call is completed;
    switching said battery from said pager and paging mode back to said cellular telephone and cellular telephone mode if sufficient charge remains;
    and completing said telephone call to said cellular telephone.

9. A method according to claim 8, wherein said determining includes monitoring a current discharge over time from said battery.

10. A method according to claim 9, wherein said determining includes integrating said current discharge over time to obtain a charge value.

11. A method according to claim 8, including storing a voltage discharge profile of said battery and monitoring points on said profile.

12. A method according to claim 11, including using said voltage discharge profile and a measured voltage to determine a period of time of remaining sufficient charge to said pager.

13. A method according to claim 7, further including notifying a user that said sufficient charge level is being approached.

14. A power control circuit for a personal communications device having a cellular telephone and a pager, wherein said personal communications device comprises:

said pager adapted in a paging mode to receive a paging message from a paging exchange indicating that a cellular telephone call is incoming, the paging message comprising an incoming call indicating message;

said cellular telephone, when turned on, adapted in a cellular telephone mode to receive an incoming call indicating message indicating that a cellular telephone call is incoming; and wherein said power control circuit comprises:

a power control processor;

one or more memory devices coupled to said power control processor;

a battery; and a switch coupled to said battery, wherein said power control processor, in response to said cellular telephone to which said cellular telephone call is directed being turned off and thus exiting said cellular telephone mode and entering said paging mode, is configured to switch power from said battery from said pager and paging mode to said cellular telephone and cellular telephone mode if a predetermined amount of charge remains in said battery and if a paging message is received indicating that a cellular phone call s to be directed to said personal communications device, said paging message comprising an incoming call indicating message.

15. A power control circuit according to claim 14, said power control processor configured to monitor current discharge of said battery over time.

16. A power control circuit according to claim 15, said power control processor configured to integrate said current discharge of said battery over time to obtain a charge value.

17. A power control circuit according to claim 14, wherein said power control processor is configured to store a voltage discharge profile of said battery and monitor points on said profile.

18. A power control circuit according to claim 17, wherein said power control processor is configured to store a voltage discharge profile of said battery and monitor points on said profile.

19. A power control circuit for a personal communications device having a cordless telephony device and a pager, wherein said personal communications device comprises:

said pager adapted in a paging mode to receive a paging message from a paging exchange indicating that a cordless phone call is incoming, the paging message comprising an incoming call indicating message;

said cordless telephony device, when turned on, adapted in a cordless telephone mode to receive an incoming call indicating message indicating that a cordless phone call is incoming; and wherein said power control circuit comprises:

a power control processor;

one or more memory devices coupled to said power control processor;

a battery; and a switch coupled to said battery, wherein said power control processor, in response to said cordless telephone to which said cordless phone call is directed being turned off and thus exiting said cordless telephone mode and entering said paging mode, is configured to switch power from said battery from said pager and paging mode back to said cordless telephony device and cordless telephone mode if a predetermined amount of charge remains in said battery and if a paging message is received indicating that a cordless phone call is to be directed to said personal communications device, said paging message comprising an incoming call indicating message.

20. A power control circuit according to claim 19, wherein said predetermined amount of charge corresponds to a configurable predetermined period for said personal communications device to remain in at least a page receive mode over said configurable predetermined period, and wherein said power control circuit resides in said personal communications device and wherein said cordless telephony device is a cordless phone, a cellular or wireless phone, a personal digital assistant (PDA), or a wireless telephony-over-LAN device.

* * * * *